United States Patent
Nadiminti et al.

(10) Patent No.: US 12,088,583 B2
(45) Date of Patent: Sep. 10, 2024

(54) PERMISSIONS FOR BACKUP-RELATED OPERATIONS

(71) Applicant: Hewlett Packard Enterprise Development LP, Houston, TX (US)

(72) Inventors: Syama Sundararao Nadiminti, Bangalore Karnataka (IN); Annmary Justine K., Bangalore Karnataka (IN); Keshetti Mahesh, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 648 days.

(21) Appl. No.: 17/302,010

(22) Filed: Apr. 21, 2021

(65) Prior Publication Data

US 2022/0150241 A1    May 12, 2022

(30) Foreign Application Priority Data

Nov. 11, 2020 (IN) .............................. 202041049345

(51) Int. Cl.
*H04L 9/40* (2022.01)
*G06F 11/14* (2006.01)
(Continued)

(52) U.S. Cl.
CPC ...... *H04L 63/0853* (2013.01); *G06F 11/1461* (2013.01); *H04L 63/10* (2013.01); *H04L 63/1416* (2013.01); *G06F 9/45558* (2013.01); *G06F 2009/45587* (2013.01); *G06F 11/1448* (2013.01); *G06F 11/1458* (2013.01); *G06F 11/1464* (2013.01); *G06F 11/3438* (2013.01); *G06F 21/33* (2013.01); *G06F 21/52* (2013.01);
(Continued)

(58) Field of Classification Search
None
See application file for complete search history.

(56) References Cited

U.S. PATENT DOCUMENTS 5,109,413 A * 4/1992 Comerford ........... G06F 21/121
705/54
5,475,834 A * 12/1995 Anglin ................ G06F 11/1458
707/999.203

(Continued)

OTHER PUBLICATIONS

Nguyen et al "LogSafe: Secure and Scalable Data Logger for IoT devices," 2018 IEEE/ACM Third International Conference on Internet-of-Things Design and Implementation, IEEE Computer Society, pp. 141-152 (Year: 2018).*

(Continued)

*Primary Examiner* — Luu T Pham
*Assistant Examiner* — James J Wilcox
(74) *Attorney, Agent, or Firm* — Trop, Pruner & Hu, P.C.

(57) ABSTRACT

Example techniques for granting permissions for performing an operation related to a backup copy are described. The backup copy corresponds to first device data and the first device data is stored in a first device. In an example, in response to receiving a request to perform the operation related to the backup copy, telemetry data received from the first device is analyzed. Based on the analysis, it is determined that security of the first device is uncompromised. Based on the determination, a permission to perform the operation related to the backup copy is granted.

18 Claims, 6 Drawing Sheets

(51) Int. Cl.
  *G06F 9/455* (2018.01)
  *G06F 11/34* (2006.01)
  *G06F 21/33* (2013.01)
  *G06F 21/52* (2013.01)
  *G06F 21/55* (2013.01)
  *G06F 21/56* (2013.01)
  *H04W 12/65* (2021.01)

(52) U.S. Cl.
  CPC .......... *G06F 21/554* (2013.01); *G06F 21/56* (2013.01); *G06F 21/566* (2013.01); *G06F 2201/805* (2013.01); *H04L 63/1408* (2013.01); *H04W 12/65* (2021.01)

(56) References Cited

U.S. PATENT DOCUMENTS

| | | | | |
|---|---|---|---|---|
| 5,659,614 | A * | 8/1997 | Bailey, III | G06F 11/1451 713/193 |
| 5,778,395 | A * | 7/1998 | Whiting | G06F 11/1453 |
| 5,943,423 | A * | 8/1999 | Muftic | G06F 21/33 705/76 |
| 6,154,852 | A * | 11/2000 | Amundson | G06F 11/1456 714/E11.122 |
| 6,260,069 | B1 * | 7/2001 | Anglin | G06F 11/1464 709/215 |
| 6,564,215 | B1 * | 5/2003 | Hsiao | G06F 11/1469 |
| 6,615,225 | B1 * | 9/2003 | Cannon | G06F 16/152 |
| 7,133,846 | B1 * | 11/2006 | Ginter | H04N 21/25875 375/E7.009 |
| 7,165,174 | B1 * | 1/2007 | Ginter | H04N 7/17309 713/153 |
| 8,255,731 | B1 * | 8/2012 | Alsina | H04L 67/04 713/340 |
| 8,467,770 | B1 * | 6/2013 | Ben Ayed | G06F 21/35 455/411 |
| 8,474,032 | B2 * | 6/2013 | Fetik | G06F 21/552 713/151 |
| 8,706,800 | B1 * | 4/2014 | Ahmed | G06F 21/602 709/201 |
| 8,732,479 | B1 * | 5/2014 | Henriksen | G06F 11/1448 709/201 |
| 8,751,793 | B2 * | 6/2014 | Ginter | H04N 21/6581 726/28 |
| 9,401,905 | B1 * | 7/2016 | Kowalski | H04L 67/34 |
| 9,448,893 | B1 * | 9/2016 | Whitehead | G06F 16/273 |
| 9,554,274 | B1 * | 1/2017 | Castinado | H04W 4/023 |
| 9,635,014 | B2 * | 4/2017 | Venkataraman | H04L 63/0815 |
| 9,659,177 | B1 * | 5/2017 | Juels | H04L 63/0853 |
| 9,690,498 | B2 * | 6/2017 | Hutchison | G06F 3/0673 |
| 9,753,813 | B1 * | 9/2017 | Fan | G06F 3/067 |
| 10,289,844 | B2 | 5/2019 | Charters et al. | |
| 10,346,258 | B2 | 7/2019 | Sella et al. | |
| 10,430,293 | B1 * | 10/2019 | Skowronski | G06F 11/1458 |
| 10,503,904 | B1 | 12/2019 | Singh et al. | |
| 10,545,834 | B1 * | 1/2020 | Smith | G06F 3/067 |
| 10,762,036 | B2 * | 9/2020 | Gokhale | G06F 11/1402 |
| 11,528,611 | B2 * | 12/2022 | Smith | H04L 67/12 |
| 11,831,773 | B1 | 11/2023 | Sadras Sudhakar | H04L 63/10 |
| 11,914,731 | B1 | 2/2024 | Velickovic | G06F 21/6218 |
| 2001/0010045 | A1 * | 7/2001 | Stefik | H04L 63/123 705/52 |
| 2002/0077986 | A1 * | 6/2002 | Kobata | G06Q 10/107 705/52 |
| 2002/0083059 | A1 * | 6/2002 | Hoffman | H04L 63/101 707/999.009 |
| 2002/0174139 | A1 * | 11/2002 | Midgley | G06F 11/2071 |
| 2003/0051039 | A1 * | 3/2003 | Brown | H04L 67/34 709/229 |
| 2003/0051109 | A1 * | 3/2003 | Cochran | G06F 3/0601 711/162 |
| 2003/0074378 | A1 * | 4/2003 | Midgley | G06F 11/1451 |
| 2003/0115144 | A1 * | 6/2003 | Stefik | H04L 63/0823 375/E7.009 |
| 2003/0115179 | A1 * | 6/2003 | Prabakaran | G06F 21/604 |
| 2003/0115251 | A1 * | 6/2003 | Fredrickson | H04L 63/14 709/201 |
| 2003/0140003 | A1 * | 7/2003 | Wang | H04L 63/12 705/39 |
| 2004/0003269 | A1 * | 1/2004 | Waxman | H04L 63/10 713/193 |
| 2004/0015723 | A1 * | 1/2004 | Pham | H04L 63/10 709/217 |
| 2004/0015724 | A1 * | 1/2004 | Pham | H04L 63/12 713/181 |
| 2004/0078568 | A1 * | 4/2004 | Pham | G06F 21/6218 713/165 |
| 2004/0107342 | A1 * | 6/2004 | Pham | H04L 67/1097 713/165 |
| 2004/0123129 | A1 * | 6/2004 | Ginter | G06F 21/31 375/E7.009 |
| 2004/0128378 | A1 * | 7/2004 | Blakley, III | H04L 63/101 709/224 |
| 2004/0128383 | A1 * | 7/2004 | Hinton | H04L 63/104 709/225 |
| 2004/0128390 | A1 * | 7/2004 | Blakley, III | H04L 63/0807 709/219 |
| 2004/0128546 | A1 * | 7/2004 | Blakley, III | H04L 63/102 726/8 |
| 2004/0168061 | A1 * | 8/2004 | Kostal | G06Q 20/3674 713/170 |
| 2004/0168073 | A1 * | 8/2004 | Bourne | H04L 63/104 713/193 |
| 2004/0168077 | A1 * | 8/2004 | Waxman | G06F 21/6227 726/28 |
| 2004/0250162 | A1 * | 12/2004 | Halley | G06F 11/1458 714/13 |
| 2005/0044361 | A1 * | 2/2005 | Chang | H04L 63/10 713/167 |
| 2005/0050226 | A1 * | 3/2005 | Larson | H04L 67/1097 709/245 |
| 2005/0060571 | A1 * | 3/2005 | Wang | G06Q 50/184 726/27 |
| 2005/0071630 | A1 * | 3/2005 | Thornton | H04L 9/3226 713/156 |
| 2005/0086172 | A1 * | 4/2005 | Stefik | H04N 21/2541 375/E7.009 |
| 2005/0138110 | A1 * | 6/2005 | Redlich | G06F 21/6254 709/201 |
| 2005/0149450 | A1 * | 7/2005 | Stefik | H04N 21/835 375/E7.009 |
| 2005/0228836 | A1 * | 10/2005 | Bacastow | G06F 11/1448 |
| 2006/0129627 | A1 * | 6/2006 | Phillips | H04L 63/10 709/200 |
| 2006/0129685 | A1 * | 6/2006 | Edwards, Jr. | H04L 63/083 709/229 |
| 2006/0174326 | A1 * | 8/2006 | Ginter | H04N 7/162 726/3 |
| 2006/0253731 | A1 * | 11/2006 | Petruzzo | G06F 11/1466 714/6.2 |
| 2007/0106551 | A1 * | 5/2007 | McGucken | H04N 21/812 705/7.29 |
| 2007/0136814 | A1 * | 6/2007 | Lee | G06F 21/552 713/188 |
| 2007/0143827 | A1 * | 6/2007 | Nicodemus | H04L 63/102 726/2 |
| 2007/0143851 | A1 * | 6/2007 | Nicodemus | H04L 63/1433 726/4 |
| 2008/0009265 | A1 * | 1/2008 | Fernandez-Alonso | H04W 12/069 455/411 |
| 2008/0034406 | A1 * | 2/2008 | Ginter | G06F 21/73 726/2 |
| 2008/0046670 | A1 * | 2/2008 | Lam | G06F 11/1448 711/161 |
| 2008/0104145 | A1 * | 5/2008 | Lipman | G06F 11/1461 |
| 2008/0147821 | A1 * | 6/2008 | Dietrich | H04L 67/1076 709/216 |
| 2008/0168135 | A1 * | 7/2008 | Redlich | G06F 21/6218 709/204 |

(56) References Cited

U.S. PATENT DOCUMENTS

| | | | |
|---|---|---|---|
| 2008/0229420 A1* | 9/2008 | Jeschke | H04L 63/1433 726/25 |
| 2008/0244732 A1* | 10/2008 | Coninck | G06F 11/1469 726/17 |
| 2008/0280644 A1* | 11/2008 | Hugot | H04L 63/0853 709/206 |
| 2008/0289044 A1* | 11/2008 | Choi | G06F 21/10 726/26 |
| 2009/0112878 A1* | 4/2009 | Denny | G06F 11/0772 |
| 2009/0228574 A1* | 9/2009 | Maures | H04L 63/10 709/219 |
| 2009/0234845 A1* | 9/2009 | DeSantis | H04L 63/308 707/999.005 |
| 2009/0310165 A1* | 12/2009 | Olsson | H04L 63/101 358/1.15 |
| 2010/0037061 A1* | 2/2010 | Stefik | H04N 21/8358 713/176 |
| 2010/0037296 A1* | 2/2010 | Silverstone | G06F 9/45558 718/1 |
| 2010/0198730 A1* | 8/2010 | Ahmed | G06F 21/30 380/278 |
| 2010/0217974 A1* | 8/2010 | Fujimoto | G06F 21/10 713/155 |
| 2010/0250497 A1* | 9/2010 | Redlich | G06Q 10/06 707/661 |
| 2010/0269164 A1* | 10/2010 | Sosnosky | G06F 16/1794 707/E17.007 |
| 2010/0306485 A1* | 12/2010 | Dubhashi | G06F 21/105 711/E12.103 |
| 2011/0060916 A1* | 3/2011 | Faitelson | G06F 21/6218 707/661 |
| 2011/0065419 A1* | 3/2011 | Book | H04W 12/37 455/410 |
| 2011/0099620 A1 | 4/2011 | Stavrou | |
| 2011/0137946 A1* | 6/2011 | Siress | G06F 21/6218 707/E17.005 |
| 2011/0145593 A1* | 6/2011 | Auradkar | H04L 9/0833 713/189 |
| 2011/0154467 A1* | 6/2011 | Bomar | G06F 21/335 726/9 |
| 2011/0246425 A1* | 10/2011 | Munoz | G06F 11/1458 707/E17.007 |
| 2011/0258082 A1* | 10/2011 | Schmieder | H04N 21/27 718/1 |
| 2011/0258208 A1* | 10/2011 | Plotnik | H04L 63/1416 707/756 |
| 2011/0276563 A1* | 11/2011 | Sandoval | H04L 63/102 707/723 |
| 2011/0314539 A1* | 12/2011 | Horton | H04W 12/30 726/20 |
| 2012/0095926 A1* | 4/2012 | Nishimura | G06Q 10/06 705/301 |
| 2012/0102088 A1* | 4/2012 | Bindal | G06F 11/1461 709/203 |
| 2012/0124368 A1* | 5/2012 | Driessen | G09C 5/00 713/153 |
| 2012/0246472 A1* | 9/2012 | Berengoltz | H04L 9/0897 713/165 |
| 2012/0260322 A1* | 10/2012 | Logan | G06F 21/33 726/6 |
| 2012/0297468 A1* | 11/2012 | Bharadwaj Subramanya | H04L 69/40 726/7 |
| 2012/0310883 A1* | 12/2012 | Akirav | G06F 16/184 707/626 |
| 2012/0310889 A1* | 12/2012 | McNeil | H04L 67/5683 707/639 |
| 2012/0310896 A1* | 12/2012 | Freedman | G06F 11/1469 707/E17.007 |
| 2012/0311280 A1* | 12/2012 | Schmidt | G06F 11/1435 711/E12.103 |
| 2013/0006943 A1* | 1/2013 | Chavda | G06F 11/1458 707/E17.007 |
| 2013/0007845 A1* | 1/2013 | Chang | H04L 63/104 726/4 |
| 2013/0007869 A1* | 1/2013 | Thomas | G06F 21/41 726/9 |
| 2013/0061035 A1* | 3/2013 | Hook | G06F 21/62 713/150 |
| 2013/0124807 A1* | 5/2013 | Nielsen | G06F 11/1482 711/E12.103 |
| 2013/0275695 A1* | 10/2013 | Ponsford | G06F 11/1456 711/E12.103 |
| 2013/0312084 A1* | 11/2013 | Tandon | H04L 63/101 726/17 |
| 2013/0318207 A1* | 11/2013 | Dotter | G06F 11/1469 709/219 |
| 2014/0075568 A1* | 3/2014 | Sathyadevan | G06F 21/554 726/27 |
| 2014/0101212 A1* | 4/2014 | Maze | G06F 16/1873 707/827 |
| 2014/0165138 A1* | 6/2014 | Maida-Smith | G06F 21/6272 726/1 |
| 2014/0181016 A1* | 6/2014 | Whitehead | G06F 11/2064 707/613 |
| 2014/0181027 A1* | 6/2014 | Whitehead | H04L 67/1095 707/639 |
| 2014/0181034 A1* | 6/2014 | Harrison | G06F 11/2069 707/646 |
| 2014/0181039 A1* | 6/2014 | Harrison | G06F 3/0608 707/652 |
| 2014/0181040 A1* | 6/2014 | Montulli | G06F 11/1464 707/652 |
| 2014/0181041 A1* | 6/2014 | Whitehead | G06F 11/1446 707/652 |
| 2014/0181051 A1* | 6/2014 | Montulli | H04L 67/1097 707/679 |
| 2014/0181579 A1* | 6/2014 | Whitehead | G06F 16/21 707/654 |
| 2014/0279921 A1* | 9/2014 | Wolfgang | G06F 11/1461 707/654 |
| 2014/0289516 A1* | 9/2014 | Sahay | H04L 63/0823 713/173 |
| 2015/0046985 A1* | 2/2015 | D'Souza | H04L 9/0825 726/4 |
| 2015/0052059 A1* | 2/2015 | Everhart | H04L 63/0428 705/51 |
| 2015/0081635 A1* | 3/2015 | Maze | G06F 16/23 707/827 |
| 2015/0132984 A1* | 5/2015 | Kim | H04L 63/0838 439/345 |
| 2015/0180894 A1* | 6/2015 | Sadovsky | H04W 12/12 726/22 |
| 2015/0244973 A1* | 8/2015 | Mullen | G11B 20/00971 386/252 |
| 2015/0317208 A1* | 11/2015 | Desantis | G06F 11/1448 707/643 |
| 2015/0371053 A1* | 12/2015 | Welch | G06F 21/6227 726/30 |
| 2015/0371057 A1* | 12/2015 | Ow | H04L 63/0815 726/28 |
| 2016/0034366 A1* | 2/2016 | Anglin | G06F 11/1451 714/4.11 |
| 2016/0055064 A1* | 2/2016 | Gostev | G06F 16/27 726/4 |
| 2016/0094584 A1* | 3/2016 | Mehta | G06F 21/44 726/4 |
| 2016/0142532 A1* | 5/2016 | Bostick | H04W 12/06 455/411 |
| 2016/0173499 A1* | 6/2016 | Bianchi | H04L 67/1057 726/26 |
| 2016/0246995 A1* | 8/2016 | Dictos | H04L 67/1095 |
| 2016/0277368 A1* | 9/2016 | Narayanaswamy | G06F 21/6209 |
| 2016/0291940 A1* | 10/2016 | Searle | H04L 67/303 |
| 2016/0291959 A1* | 10/2016 | Searle | H04L 41/082 |
| 2016/0294605 A1* | 10/2016 | Searle | H04L 41/069 |

(56) References Cited

U.S. PATENT DOCUMENTS

| | | | | |
|---|---|---|---|---|
| 2016/0294614 | A1* | 10/2016 | Searle | H04L 67/34 |
| 2016/0316247 | A1* | 10/2016 | Biagini | H04N 21/25816 |
| 2016/0342483 | A1* | 11/2016 | Klingenberg | G06F 11/00 |
| 2017/0018130 | A1* | 1/2017 | Robinson | G07C 9/28 |
| 2017/0026385 | A1* | 1/2017 | Zarkesh | H04W 4/80 |
| 2017/0083406 | A1* | 3/2017 | Qi | G06F 11/1451 |
| 2017/0099293 | A1* | 4/2017 | Tan | G06F 21/6218 |
| 2017/0132086 | A1* | 5/2017 | Blackburn | G06F 11/1466 |
| 2017/0220425 | A1* | 8/2017 | Anders | H04L 67/1097 |
| 2017/0235490 | A1* | 8/2017 | Tan | H04N 21/231 |
| | | | | 711/152 |
| 2017/0333779 | A1* | 11/2017 | El Labban | A63B 71/0616 |
| 2017/0346851 | A1* | 11/2017 | Drake | H04L 9/0838 |
| 2017/0353500 | A1* | 12/2017 | Jacobsen | H04L 63/102 |
| 2018/0026984 | A1* | 1/2018 | Maker | H04L 63/102 |
| | | | | 726/4 |
| 2018/0034835 | A1 | 2/2018 | Iwanir et al. | |
| 2018/0145969 | A1* | 5/2018 | Agrawal | H04L 63/105 |
| 2018/0145970 | A1* | 5/2018 | Agrawal | H04L 63/105 |
| 2018/0196960 | A1* | 7/2018 | Gullicksen | H04L 63/107 |
| 2018/0225177 | A1* | 8/2018 | Bhagi | G06F 11/1451 |
| 2018/0285205 | A1* | 10/2018 | Mehta | G06F 11/1456 |
| 2018/0300205 | A1* | 10/2018 | Sehgal | G06F 11/1451 |
| 2018/0322260 | A1* | 11/2018 | Adam | G06F 21/604 |
| 2018/0336554 | A1* | 11/2018 | Trotter | H04L 63/0853 |
| 2018/0341666 | A1* | 11/2018 | Lee | G06F 11/1464 |
| 2019/0068622 | A1* | 2/2019 | Lin | H04L 63/1441 |
| 2019/0196981 | A1* | 6/2019 | Silvert | G06F 21/6218 |
| 2019/0207929 | A1* | 7/2019 | Koorapati | H04L 63/10 |
| 2019/0230092 | A1* | 7/2019 | Patel | H04L 9/3247 |
| 2019/0294505 | A1* | 9/2019 | Hempelmann | G06F 11/1451 |
| 2020/0007311 | A1* | 1/2020 | Oberhofer | H04L 63/102 |
| 2020/0057697 | A1* | 2/2020 | Yeung | G06F 11/1466 |
| 2020/0097177 | A1* | 3/2020 | Ashokkumar | G06F 3/065 |
| 2020/0117549 | A1* | 4/2020 | Bansal | G06F 11/1461 |
| 2020/0128024 | A1* | 4/2020 | Kuramkote | H04L 41/0816 |
| 2020/0175184 | A1* | 6/2020 | Ved | G06F 3/067 |
| 2020/0228343 | A1* | 7/2020 | Yu | H04L 9/3247 |
| 2020/0259667 | A1* | 8/2020 | Garnier | H04L 67/12 |
| 2020/0319799 | A1* | 10/2020 | Mayer | G06F 3/061 |
| 2020/0320215 | A1* | 10/2020 | Bhosale | G06F 11/1456 |
| 2020/0327017 | A1* | 10/2020 | Vijayan | G06F 11/1451 |
| 2020/0344235 | A1* | 10/2020 | Bhuiyan | H04L 63/102 |
| 2020/0344237 | A1* | 10/2020 | Murdoch | H04L 63/102 |
| 2020/0351271 | A1* | 11/2020 | Murdoch | H04L 63/102 |
| 2020/0351347 | A1* | 11/2020 | Chang | G06F 9/45558 |
| 2020/0356450 | A1* | 11/2020 | Littlefield | G06F 11/1466 |
| 2020/0364354 | A1* | 11/2020 | Schwartz | H04L 9/3268 |
| 2020/0382557 | A1* | 12/2020 | Woolward | H04L 63/1441 |
| 2020/0401489 | A1* | 12/2020 | Mitkar | G06F 11/1469 |
| 2020/0403996 | A1* | 12/2020 | Parimi | H04L 63/20 |
| 2020/0409795 | A1* | 12/2020 | Lim | G06F 9/45558 |
| 2021/0014243 | A1* | 1/2021 | Kulaga | H04L 63/1416 |
| 2021/0027265 | A1* | 1/2021 | Hasek, IV | H04L 9/3239 |
| 2021/0042199 | A1* | 2/2021 | Migga-Vierke | H04L 63/0272 |
| 2021/0067638 | A1* | 3/2021 | Liu | G06F 11/1456 |
| 2021/0157680 | A1* | 5/2021 | LeCrone | G06F 11/1464 |
| 2021/0165720 | A1* | 6/2021 | Bode | G06F 11/1448 |
| 2021/0240572 | A1* | 8/2021 | Upadhyay | G06F 11/1461 |
| 2021/0240573 | A1* | 8/2021 | Upadhyay | G06F 11/1451 |
| 2021/0240574 | A1* | 8/2021 | Upadhyay | G06F 16/162 |
| 2021/0303411 | A1* | 9/2021 | Kvache | G06F 11/1456 |
| 2021/0303416 | A1* | 9/2021 | Brenner | G06N 5/025 |
| 2021/0406129 | A1* | 12/2021 | Zheng | G06F 16/1756 |
| 2021/0409227 | A1* | 12/2021 | Ponnuswamy | H04L 9/0825 |
| 2022/0043717 | A1* | 2/2022 | Yadav | G06F 11/1458 |
| 2022/0277068 | A1* | 9/2022 | Miyazaki | G06F 21/57 |

OTHER PUBLICATIONS

Kaur et al "Secure VM Backup and Vulnerability Removal in Infrastructure Clouds," IEEE, pp. 1217-1226, (Year: 2014).*

Ottaviani et al "Shared Backup and Restore," IEEE, pp. 1-5 (Year: 2011).*

Zhao et al "Research and Implementation of Data Storage Backup," 2018 IEEE International Conference on Energy Internet, IEEE Computer Society, pp. 181-184 (Year: 2018).*

Bae et al "A Secure Secondary Backup Storage with an Isolated Authentication," 2012 Sixth International Conference on Innovative Mobile and Internet Services in Ubiquitous Computing, IEEE, pp. 122-125 (Year: 2012).*

EzmeralExperts; "Expand backups to secondary storage: HPE SimpliVity hyperconverged infrastructure and HPE StoreOnce", May 26, 2020, 3 pages, retrieved from https://community.hpe.com/t5/Around-the-Storage-Block/Expand-backups-to-secondary-storage-HPE-SimpliVity/ba-p/7088771.

Hewlett Packard Enterprise, "HPE InfoSight: Artificial Intelligence for autonomous infrastructure", Feb. 2020, 6 pages.

Microsoft Docs; "Overview of security features in Azure Backup"; Mar. 12, 2020; 5 pages.

Veeam, "Ransomware: A modern threat to modern data", Sep. 4, 2020, 9 pages.

* cited by examiner

PERMISSIONS FOR BACKUP-RELATED OPERATIONS

BACKGROUND

Data stored in a computing device may become unusable due to various reasons, such as due to deletion of corruption of the data. To prevent the loss of the data altogether due to the non-usability, a backup copy of the data may be utilized to restore the data in the computing device. The backup copy may be stored remotely from the computing device, such as on a cloud storage device.

BRIEF DESCRIPTION OF DRAWINGS

The following detailed description references the figures, wherein.

DETAILED DESCRIPTION

Data stored in a computing device may be rendered unusable, for example, due to the presence of malware in the computing device. For example, ransomware, a type of malware, encrypts files in the computing device, thereby preventing a user from using the files. A key for decrypting the files may be provided to the user upon payment of a ransom amount.

A backup copy of the data may be utilized to restore the data if the data becomes unusable. However, in some cases, the backup copy may also become unusable. This may be, for example, if the malware propagates to the backup copy during execution of backup operations and renders the backup copy unusable, such as by modifying or deleting the backup copy.

The present subject matter relates to permissions for backup-related operations. With the implementations of the present subject matter, backup copies can be prevented from becoming unusable due to malware attacks.

In accordance with an example implementation, a request may be received to permit performance of an operation related to a backup copy. An operation related to a backup copy may also be referred to as a backup-related operation and may include, for example, creation, modification, or deletion of the backup copy. The backup copy may correspond to first device data that is stored in a first device. Further, the backup copy may be stored in a second device.

In an example, the first device data may be related to a virtual machine (VM) hosted on the first device and the backup copy may be a VM image from which the VM can be restored.

In response to receiving the request, telemetry data received from the first device is analyzed. The telemetry data may include information of operations performed on the first device. For instance, the telemetry data may include information of login attempts made, number of file encryptions, number of file deletions, workload parameters of hardware components of the first device (hardware components may be, for example, processor, memory, and storage), or any combination of the foregoing. In an example, telemetry data received within a particular time period relative to a time of receipt of the request is analyzed. For instance, telemetry data received within a first time period before the time of receipt of the request, telemetry data received within a second time period after the time of receipt of the request, or both are analyzed. In an example, the analysis of the telemetry data may be performed by a system that periodically receives the telemetry data from the first device to identify or predict the occurrence of a fault in the first device.

Based on the analysis, it is determined whether security of the first device is compromised. The security of the first device may be determined to be compromised, for example, if a number of login attempts in a particular time period is greater than an average number of login attempts. If it is determined that the security of the first device has not been compromised, the backup-related operation is permitted to be performed. To permit the performance, in an example, a token granting permission may be transmitted to the first device, which may send the token to the second device. Based on the token, the second device may perform the backup-related operation. If the security of the first device is determined to be compromised, the request to perform the backup-related operation is denied.

In an example, to determine whether security of the first device has not been compromised, in addition to analysis of the telemetry data, a secure handshake-based verification may also be utilized. To perform the secure handshake-based verification, the system that analyzes the telemetry data may also attempt to establish a secure handshake with the first device. In response to establishment of the secure handshake, the system may determine that security of the first device is uncompromised.

The present subject matter may prevent loss or non-usability of a backup copy due to malware attacks on a computing device storing parent data, i.e., the data to which the backup copy corresponds. Thus, the backup copies may be made immune to malware attacks on the computing devices storing the parent data. The present subject matter utilizes telemetry data of a computing device sending a request for the backup-related operation to determine whether security of the computing device is compromised. Thus, the present subject matter may provide a simpler and a more efficient determination regarding the security of the computing device. Further, the present subject matter may leverage the telemetry data that is already received from the computing device for identification and prediction of faults. Thus, little or no additional data may have to be provided by the computing device to implement the present subject matter.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Figure 1:
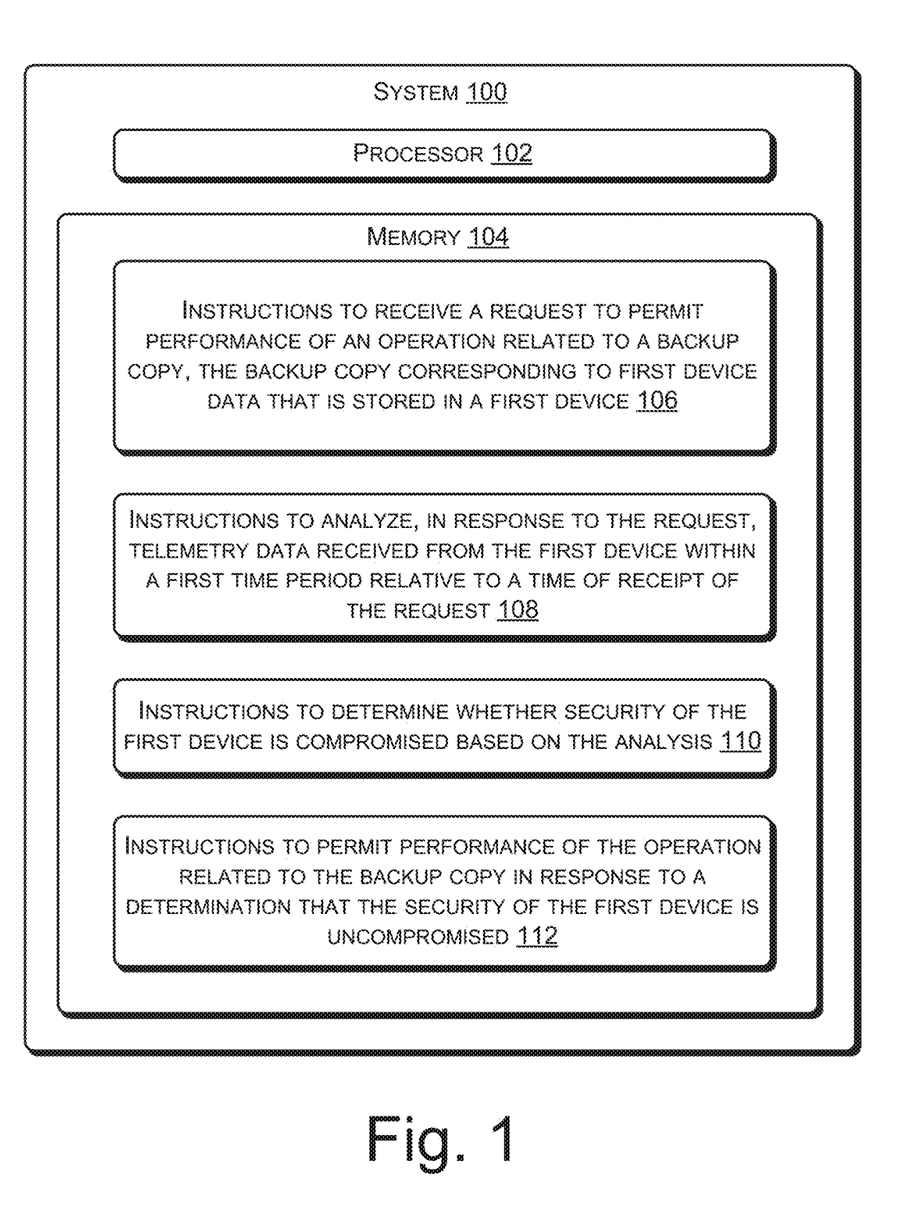
FIG. 1 illustrates a system for permitting performance of backup-related operations, according to an example implementation of the present subject matter.

FIG. 1 illustrates a system 100 for permitting performance of operations related to backup copies, according to an example implementation of the present subject matter. The system 100 may be implemented as a computing device, such as a desktop computer, a laptop computer, a server, or the like. The system 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106-112. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the instructions 106 are executable to receive a request to permit performance of an operation related to a backup copy. An operation related to a backup copy may also be referred to as a backup-related operation, and may be, for example, a backup creation operation, a backup modification operation, or a backup deletion operation. The request may also be referred to as a permission request. The backup copy may correspond to first device data that is stored in a first device (not shown in FIG. 1). For example, the backup copy may be an exact copy of the first device data. The backup copy may be stored in a second device (not shown in FIG. 1). In an example, the first device data and the backup copy may include data corresponding to the first device. Further, the backup copy may be an image from which the first device can be restored to its operational state. For instance, the first device data and the backup copy may include data corresponding to a Virtual Machine (VM) that is hosted on the first device. The data corresponding to the VM may include, for example, files, folders, applications, and operating system (OS) of the VM. Accordingly, the backup copy may be a VM image from which the VM can be instantiated. The permission request may be sent to the system 100 by the first device.

In response to the request, telemetry data received from the first device is analyzed. In an example, the telemetry data may indicate the operations performed on the first device, workload information of hardware components of the first device, read count of data of the first device, write count of data of the first device, a number of failed attempts to perform a backup-related operation, a backup policy, or a combination thereof. The data may include, for example, the first device data. The operations performed on the first device may be, for example, a number of login attempts, a number of file encryptions, a number of file modifications, a number of file deletions, or a combination thereof. The workload information of the hardware components may include, for example, workload of a processor of the first device, workload of a memory of the first device, Input/Output operations per second (IOPS) of a storage of the first device, or a combination thereof. The read count of the data and the write count of data denotes the number of times the data is read from and written to respectively. The number of failed attempts to perform a backup-related operation help to track previously identified backup issues. An attempt to perform a backup-related operation may have failed, for example, if the security of the first device was determined to have been compromised, as will be explained later. A backup policy of the first device may indicate a frequency of backup creation operation (i.e., how often a backup copy is to be created), a backup retention period (i.e., for how long a backup copy is to be retained), and a backup target (i.e., where a backup copy is to be stored). In an example, instead of the backup policy, the telemetry data may include an identifier of the backup policy. Further, the system 100 may have stored therein the backup policy and the identifier. Accordingly, upon receiving the identifier as part of the telemetry data, the system 100 may retrieve and analyze the backup policy.

In an example, the system 100 may analyze telemetry data that is received within a first time period (also referred to as a "first period"). The first time period may be defined relative to a time when the request is received. For instance, the system 100 may analyze telemetry data that is received within a first period before receipt of the request. Instead of, or in addition to, analyzing the telemetry data received in the first time period before the receipt of the request, the system 100 may analyze telemetry data that is received in a second time period after receipt of the request. The analysis of the telemetry data may be performed when the instructions 108 are executed.

Based on the analysis, it is determined if a security of the first device is compromised. The security of the first device may be compromised, for example, due to a malware attack. The determination regarding the security of the first device is performed when the instructions 110 are executed. If it is determined that the security of the first device is uncompromised, a permission is provided for performing the backup-related operation. To provide the permission, the system 100 may transmit a token indicating the permission to the first device. The permission may be provided when the instructions 112 are executed.

Figure 2:
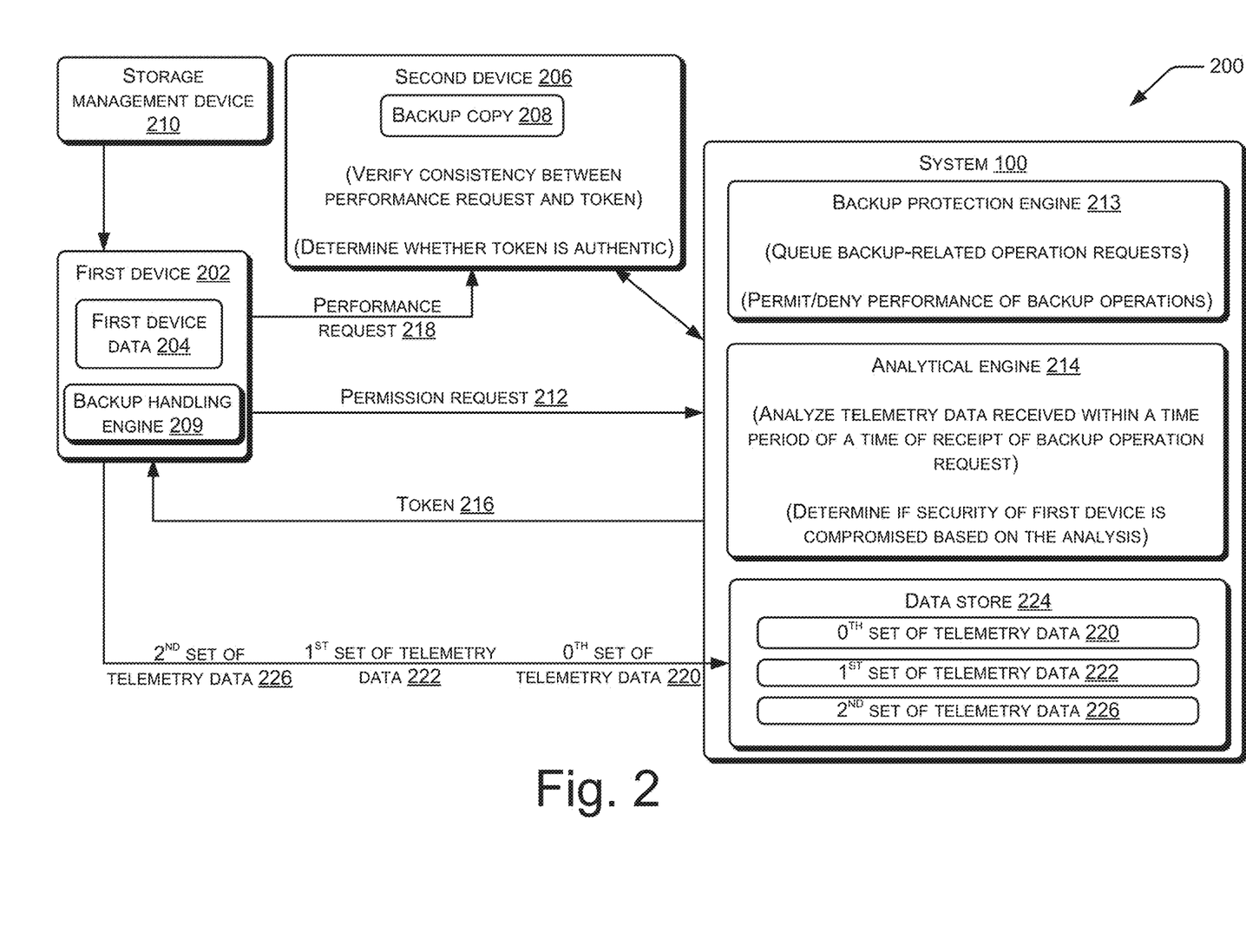
FIG. 2 illustrates a network environment implementing a system to permit performance of backup-related operations, according to an example implementation of the present subject matter.

FIG. 2 illustrates a network environment 200 implementing the system 100 to permit performance of backup-related operations, according to an example implementation of the present subject matter. The network environment 200 includes a first device 202. In an example, the first device 202 may be a server computer. In another example, the first device 202 may be a hyperconverged infrastructure device, in which compute, storage, and networking are integrated. The first device 202 may be provided in a data center or in a remote site, such as an offshore drilling rig. The first device 202 may have a first device data 204 stored therein. The first device data 204 may include files, folders, or the like. In an example, the first device data 204 may be data corresponding to a VM (not shown in FIG. 2) hosted in the first device 202. In another example, the first device data 204 may be data corresponding to the first device 202.

The network environment 200 also includes a second device 206 that is to store backup copies of parent data stored in other devices. For example, the second device 206 may store a backup copy 208 that corresponds to the first device data 204. The backup copy 208 may include a copy, a replica, an image, or the like of the first device data 204. In an example, the backup copy 208 may be an image of the VM hosted in the first device 202 and from which the VM can be restored or may be an image from which the first device 202 can be restored. The second device 206 may include a storage (not shown in FIG. 2), such as a hard disk or a solid-state disk (SSD) for storing the backup copies. In an example, the first device 202 may be an edge device and the second device 206 may be a core device corresponding to the edge device. A core device corresponding to an edge device may refer to a device that may receive data from the edge device for further processing, that may instruct the edge device to perform a computing task, or both. The core device may have more storage capability as compared to the edge device, and can therefore store backup copies from the edge device.

The first device data 204 may be restored in the first device 202 from the backup copy 208 when the first device data 204 becomes unusable. The non-usability of the first device data 204 may be, for example, due to corruption of a storage (not shown in FIG. 2) of the first device 202, inadvertent deletion, or the like. The non-usability may also be due to a compromise in the security of the first device 202. For example, the first device 202 may be infected by a ransomware, which may cause encryption of data in the first device 202. In some cases, the security compromise of the first device 202 may affect the backup copy 208 as well. For instance, the ransomware that has infected the first device 202 may cause deletion of the backup copy 208. The ransomware may also cause modification of the backup copy 208, such as by causing deletion of parts of the backup copy 208, encryption of the backup copy 208, or modification of metadata of the backup copy 208, such that the first device data 204 cannot be restored from the backup copy 208. The ransomware may also cause creation of an encrypted backup copy in the second device 206 by instructing the second device 206 to store the encrypted backup copy. The key for the encryption may be known to the creators of the ransomware and not to a user of the first device 202. Thus, the encryption renders that backup copy non-usable. The ransomware may also cause creation of a new backup copy that replaces (and thus deletes) an uncorrupted backup copy, such as the backup copy 208.

To help prevent deletion, modification, or replacement of the backup copy 208 due to a compromise in the security of the first device 202, in an example, the first device 202 includes a backup handling engine 209. In an example, the backup handling engine 209 may be implemented by a processor of the first device 202 by executing a set of instructions (not shown in FIG. 2). The backup handling engine 209 receives a request to perform a backup-related operation. The backup handling engine 209 may receive the request related to the backup-related operation, for example, from a user of the first device 202 or a storage management device 210 that administers storage of backup copies corresponding to data in the first device 202. In case of the latter, the storage management device 210 may send the request based on, for example, a backup policy or an instruction from a storage administrator. In an example, in case of a malware attack on the first device 202, the request to the backup handling engine 209 may be sent by the malware.

In an example, the request may specify a backup-related operation to be performed. The request may also specify the name of the device data or of the backup copy corresponding to the backup-related operation. For instance, the request may specify that a new backup copy of the first device data 204 is to be created or that the backup copy 208 is to be deleted. Upon receiving the request, the backup handling engine 209 sends a permission request 212 to the system 100 to permit performance of the backup-related operation. In an example, the permission request 212 may specify the backup-related operation to be performed and may specify the name of the device data or of the backup copy, i.e., the first device data 204 or the backup copy 208 respectively, or both corresponding to the backup-related operation. By sending a permission request to the system 100 in response to each request received, the backup handling engine 209 may prevent execution of a malicious request that is generated by a malware. In another example, the permission request 212 may be sent by the second device 206. The second device 206 may send the permission request 212 in response to receiving a request to perform a backup-related operation from the backup handling engine 209. The permission request 212 may be referred to as corresponding to the first device 202, as the first device 202 stores the parent data of the backup copy to which the permission request 212 corresponds.

Upon receiving the permission request 212, the system 100 may determine whether security of the first device 202 (the device corresponding to the permission request 212) is compromised. The determination as to whether the security of the first device 202 is compromised may also be referred to as verifying the security of the first device 202.

The system 100 includes a backup protection engine 213 that receives permission requests, such as the permission request 212, from computing devices, such as the first device 202, and queues the permission requests. Further, the backup protection engine 213 causes an analytical engine 214 to verify the security of a device corresponding to each queued permission request. In an example, the backup protection engine 213 and the analytical engine 214 may each be implemented by the processor 102 by executing a set of instructions (not shown in FIG. 2).

To verify the security of the first device 202, the analytical engine 214 may utilize telemetry data sent by the first device 202. The information included in the telemetry data can be used to verify whether the first device 202 is under a malware attack. For example, the number of login attempts, which may be part of the telemetry data, may indicate the number of successful and unsuccessful attempts to login to the first device 202 in a period of time. A high number of unsuccessful login attempts in a short period of time may suggest an unauthorized attempt to intrude into the first device 202. A high number of file encryptions within a short period of time may indicate ransomware activity in the first device 202. Similarly, a large number of file modifications or file deletions, a high workload of the hardware components, a large read count or a write count of data, or a large number of failed attempts to perform a backup-related operation may indicate ransomware activity. Further, a new backup policy, which may be part of the telemetry data, that indicates a reduced backup retention period or an increased frequency of backup creation may also indicate ransomware activity. Accordingly, based on analysis the telemetry data, the analytical engine 214 may verify the security of the first device 202.

In an example, the analysis of the telemetry data includes comparing an actual parameter value that is received as part of the telemetry data with an expected parameter value. The expected parameter value may be a predefined range or value that a corresponding part of the telemetry data should meet when the security of the first device 202 is uncompromised. For instance, if the actual parameter value is significantly different than the expected parameter value, it may be determined that the security of the first device 202 is compromised. The expected parameter value may be provided, for example, by a user or may be determined by the analytical engine 214.

In an example, to verify the security of the first device 202 based on the telemetry data, in an example, the analytical engine 214 may utilize machine learning techniques, such as an Auto Regressive Integrated Moving Average (ARIMA) linear regression model, that can detect anomalies in the data received. The analytical engine 214 may monitor the parameters of the telemetry data received in the past and may forecast an expected parameter value that a corresponding part of the telemetry data should meet. The analytical engine 214 may also compare the expected parameter value with a corresponding actual parameter value received as part of the telemetry data. If the actual parameter value received in the telemetry data is considerably different than the expected parameter value (e.g., if the difference between the actual parameter value and the expected parameter value exceeds a threshold), the analytical engine 214 may determine that the security of the first device 202 is compromised. For instance, if the actual number of login attempts is significantly higher than the expected number of login attempts, the security of the first device 202 may be determined to be compromised. The analytical engine 214 may also compare the telemetry data that was received during the previous occurrence of a malware attack with the current telemetry data. If the two sets of telemetry data are similar (e.g., if the difference between the parameter values of the two sets of telemetry data is less than a threshold), the analytical engine 214 may determine that the security of the first device 202 has been compromised. In an example, the analytical engine 214 may compare the backup policy received in the telemetry data with the past telemetry data to identify a suspicious change in the backup policy, such as a reduction in the backup retention period or an increase in the frequency of backup creation.

As mentioned earlier, the telemetry data may include read count and write count of data. In an example, the system 100 may analyze the read count and the write count of the data that corresponds to the permission request 212, and may not analyze the read count and write count of the other data. For instance, since the permission request 212 corresponds to the first device data 204, the system 100 may analyze the read count and the write count of the first device data 204, and not analyze the read counts and the write counts of the other data. Thus, a wasteful analysis of the other read counts and the write counts is avoided.

Upon verifying the security of the first device 202 based on the telemetry data, the analytical engine 214 may provide the result of the analysis to the backup protection engine 213. Based on the result, the backup protection engine 213 may allow the backup-related operation to execute. For instance, if it is determined that the security of the first device 202 is uncompromised, the backup protection engine 213 may grant permission to perform the backup-related operation to the first device 202, for example, by sending a token 216 to the first device 202. If the security of the first device 202 is compromised, the backup protection engine 213 may refuse permission to perform the backup-related operation, such as by not sending the token 216 and/or by sending a refusal message (not shown in FIG. 2).

In an example, the token 216 may indicate the backup-related operation for which permission is granted and may indicate the name of the first device data 204 and/or of the backup copy 208, corresponding to which the backup-related operation is to be performed. For instance, the token 216 may indicate that permission is granted for creating a new backup copy of the first device data 204 or for deleting the backup copy 208. The details of the backup-related operation and the device data/backup copy that are to be indicated in the token 216 may be obtained from the permission request 212.

Upon receiving the token 216, the first device 202 may transmit a performance request 218 to the second device 206 for performing the backup-related operation. The performance request 218 may include details of the backup-related operation, such as a new backup copy that is to be stored in the second device 206, changes to be made to the backup copy 208, or an instruction to delete the backup copy 208. In addition to the performance request 218, the first device 202 may also transmit the token 216 to the second device 206. Based on the token 216, the second device 206 may determine that the security of the first device 202 is verified. Further, the second device 206 may verify whether the token 216 permits performance of the backup-related operation specified in the performance request 218.

The second device 206 may also verify whether the token 216 specifies the name of the device data or of the backup copy corresponding to which an operation is sought. For instance, if the performance request 218 indicates that a new backup copy of the first device data 204 is to be created, the second device 206 may check if the token 216 permits creation of a backup copy of the first device data 204. Thus, the second device 206 verifies whether the performance request 218 is consistent with the token 216. In response to a successful verification, the second device 206 performs the backup-related operation as specified in the performance request 218. The specification of the backup-related operation and the names of the backup copy and/or the device data in the token 216, and the verification of the token 216 by the second device 206 ensures that the backup-related operation performed is same as the one for which the permission was granted by the system 100.

In an example, instead of or in addition to verifying the consistency between the performance request 218 and the token 216, the second device 206 may determine whether the token 216 is authentic. To perform the determination, the second device 206 may send an authentication request to the system 100, requesting the system 100 to verify whether the token 216 was issued by the system 100 and whether the token 216 is valid. Upon receiving the request, the system 100 may verify the authenticity and validity of the token 216. For instance, the system 100 may verify that the token 216 was indeed issued by the system 100 and that the token 216 was issued in response to a recent permission request. In response to successful authentication of the token 216, the system 100 may send a message to the second device 206 indicating that the token 216 is authentic. Performing the backup-related operation after authentication of the token 216 prevents a scenario in which the backup-related operation is performed based on a fake token created by a malware.

If the security of the first device 202 is compromised, the backup protection engine 213 may refuse permission to perform the backup-related operation, such as by not sending the token 216 and/or by sending a refusal message (not shown in FIG. 2). Accordingly, the first device 202 does not send the performance request 218 to the second device 206. Even if the first device 202 sends the performance request 218 to the second device 206, the second device 206 refuses to perform the backup-related operation, as the token 216 is not sent to the second device 206. In another example, upon verification of security of the first device 202, the system 100 may send the token 216 to the second device 206, instead of the first device 202. Based on the token 216, the second device 206 may carry out the backup-related operation as indicated by the performance request 218.

The grant or refusal of permission to perform the backup-related operation may be thus performed without having to analyze the contents of the backup copy 208 or the first device data 204. For instance, the system 100 does not have to compare a backup copy that is to be newly created against the backup copy 208. Similarly, the system 100 does not have to process the proposed changes to be made to the backup copy 208 or analyze the actions carried out on the first device data 204. Instead, as explained above, the granting and refusal of permission may be performed based on an analysis of the telemetry data received from the first device 202. This can help to improve privacy of user data that is part of the first device data 204 and the backup copy 208. Also, since the first device data 204 and the backup copy 208 are not to be transmitted to the system 100 and since the size of the telemetry data is small (e.g., in the range of kilobytes), the amount of data to be transmitted to the system 100 is minimal.

In an example, the system 100 may periodically receive the telemetry data from the first device 202. For instance, a set of telemetry data may be received by the system 100 after expiration of a particular time interval. Further, the set of telemetry data may indicate, for example, the operations performed on the first device 202 in that time interval, the workload information of the hardware components of the first device 202 in that time interval, the backup policy that was in force in that time interval, or any combination of the foregoing. For example, a zeroth set of telemetry data 220 may indicate the operations performed, workload of the hardware components, or backup policy in force in a time interval between T=0 and T=1 minute, a first set of telemetry data 222 may indicate the operations performed, workload of the hardware components, or backup policy in force in a time interval between T=minute 1 and T=minute 2, and so on. The sets of telemetry data received may be stored in a data store 224. The data store 224 may be, for example, a data lake.

In an example, to verify the security of the first device 202, the analytical engine 214 may utilize the sets of telemetry data that are in temporal proximity of the time of receipt of the permission request 212. For instance, the analytical engine 214 may analyze the sets of telemetry data that were received in a first time period before the receipt of the permission request 212. The sets of telemetry data received in the first time period before the receipt of the permission request 212 may be referred to as eligible past telemetry data. Consider that the first time period is 5 minutes long and that the permission request 212 was received at $t^{th}$ minute from a reference point of time. Accordingly, the analytical engine 214 may analyze the sets of telemetry data received between $t^{th}$ minute and 5 minutes prior to the $t^{th}$ minute. Thus, if the zeroth set of telemetry data 220 was received between $t^{th}$ minute and 5 minutes prior to the $t^{th}$ minute, the zeroth set of telemetry data 220 is part of eligible past telemetry data, and is analyzed by the analytical engine 214.

Instead of, or in addition to, analyzing the eligible past telemetry data, the analytical engine 214 may analyze the sets of telemetry data that are received in a second time period after the receipt of the permission request 212. The sets of telemetry data received in the second time period after the receipt of the permission request 212 may be referred to as eligible future telemetry data. Consider that the second time period is 5 minutes long and that the permission request 212 was received at $t^{th}$ minute from a reference point of time. Accordingly, the analytical engine 214 may analyze the sets of telemetry data received between $t^{th}$ minute and 5 minutes after the $t^{th}$ minute. Thus, if the first set of telemetry data 222 is received between the $t^{th}$ minute and 5 minutes after the $t^{th}$ minute, the first set of telemetry data 222 is part of eligible future telemetry data, and is analyzed by the analytical engine 214. Further, if a second set of telemetry data 226 is received 5 minutes after the $t^{th}$ minute, the second set of telemetry data 226 is not analyzed by the analytical engine 214. The analysis of the telemetry data in temporal proximity of the permission request 212 ensures that relevant data is considered for verifying the security of the first device 202.

In an example, the analysis of the telemetry data may include comparing the telemetry data in temporal proximity of the permission request 212 with the remainder of the telemetry data received from the first device 202 and stored in the data store 224. Based on the comparison, if it is determined that there are significant deviations between the telemetry data in temporal proximity of the permission request 212 and the remainder of the telemetry data, the system 100 may determine that the security of the first device 202 is compromised.

In an example, the length of the second time period may be equal to that of the first time period. Also, in an example, the lengths of the first time period and the second time period may each be a multiple of a length of the time interval at which the sets of telemetry data are received from the first device 202. For instance, the sets of telemetry data may be received once in one minute, and the first and the second time periods may each have a length of five minutes.

In an example, the system 100 may receive a heartbeat message periodically from the first device 202. The heartbeat message may indicate that the first device 202 is functional, and may be sent at a higher frequency than the telemetry data. Further, the system 100 may initiate the analysis of the sets of telemetry data as explained above if a heartbeat message is received after the permission request 212. Thus, the permission request 212 is processed after ensuring that the first device 202 is functional. Therefore, the present subject matter prevents wasteful expenditure of resources for processing a request corresponding to a non-functional device.

The telemetry data may be received from the first device 202 regardless of whether a backup-related request is received. In an example, the system 100 may be a system that periodically receives and analyzes at least some parts of the aforesaid telemetry data to identify or predict faults in the operation of the first device 202. For example, the system 100 may perform analytical operations on some parts of the telemetry data, such as workload information of the hardware components, and predict an impending failure of a component of the first device 202. Since the first device 202 already transmits at least some parts of the aforesaid telemetry data to the system 100 for identification and prediction of faults, the present subject matter ensures that little to no additional data is to be transmitted by the first device 202 to verify the security of the first device 202 and to process backup-related requests corresponding to the first device 202. Therefore, the techniques of the present subject matter can be implemented with minimal overhead to the first device 202.

Although the system 100 is described as periodically receiving the telemetry data, in an example, another device (not shown in FIG. 2) connected to the system 100 may receive the telemetry data. Further, the system 100 may fetch the past telemetry data and/or the future telemetry data to be analyzed from the other device in response to receiving a backup-related request.

Although not shown, the various components of the network environment 200 may communicate with each other over a communication network, which may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network may include various network entities, such as transceivers, gateways, and routers.

Figure 3:
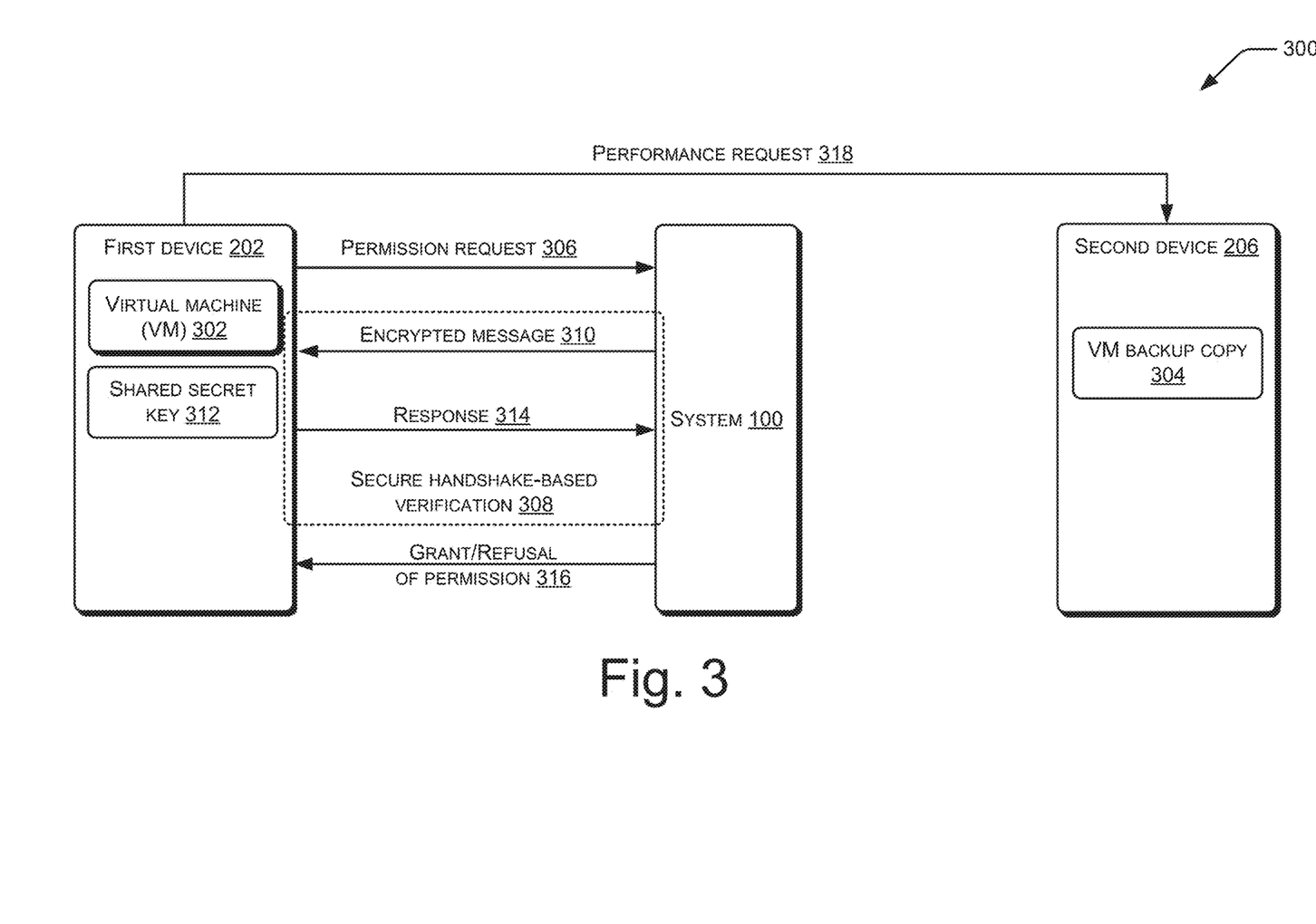
FIG. 3 illustrates a network environment implementing verification of security of a first device for permitting performance of backup-related operations, according to an example implementation of the present subject matter.

FIG. 3 illustrates the network environment 300 implementing verification of security of the first device 202 for permitting performance of backup-related operations, according to an example implementation of the present subject matter. The network environment 300 may correspond to the network environment 200.

The first device data 204 (not shown in FIG. 3) may relate to a VM 302 hosted in the first device 202. Further, the second device 206 may include a backup copy 304 corresponding to the VM 302. The backup copy 304 corresponding to the VM 302 may be referred to as a VM backup copy. In the below explanation, the present subject matter is explained with reference to an example in which a backup copy stored in the second device 206 is a VM backup copy.

The system 100 may receive a permission request 306 to perform a VM backup-related operation, such as modification or deletion of the VM backup copy 304 or creation of a new VM backup copy. As explained above, in response to receiving the request, the system 100 may analyze the telemetry data of the first device 202 to verify the security of the first device 202. If the security of the first device 202 is determined to be uncompromised based on its telemetry data, in an example, the system 100 may verify the security of the first device 202 by establishing a secure handshake with the first device 202.

A secure handshake-based verification 308 involves the system 100 transmitting a message 310 to the first device 202. The message 310 is encrypted with a shared secret key 312 that is known to the first device 202 and the system 100. The shared secret key 312 may be stored in a storage or a memory (not shown in FIG. 3) of the first device 202. If the first device 202 is not infected by ransomware, i.e., if the security of the first device 202 is uncompromised, the shared secret key 312 may be stored in the first device 202 in an unencrypted state. Therefore, the shared secret key 312 is accessible to the first device 202 and is used by the first device 202 to decrypt the message 310. Upon decryption, the first device 202 may send a response 314 to the message 310. In an example, the response 314 may be sent as part of a heartbeat message. The receipt of the response 314 establishes a secure handshake between the first device 202 and the system 100. If the security of the first device 202 is compromised, the shared secret key 312 may be stored in an encrypted state on the first device 202, as the malware may have encrypted data stored on the first device, and may be inaccessible to the first device 202. Therefore, the first device 202 may not send the response 314 to the system 100. Thus, the secure handshake is not established, and the system 100 determines that the security of the first device 202 is compromised. In an example, the system 100 determines that the security of the first device 202 is compromised in response to non-receipt of the response 314 within a predetermined period of transmission of the message 310.

The system 100 may grant permission to perform the backup-related operation upon establishment of the secure handshake and may refuse permission in response to non-establishment of the secure handshake. The grant or refusal of the permission may be sent to the first device 202, as indicated by the arrow 316, or the second device 206. The grant of permission may be indicated by transmitting a token, as explained earlier. Upon grant of permission, the first device 202 may send a performance request 318 to the second device 206. The performance request 318 may include a new VM backup copy, proposed changes to the VM backup copy 304, or an instruction to delete the VM backup copy 304. Thus, the secure handshake-based verification 308 acts as a second stage of verification of security of the first device 202. Thus, the accuracy in verification of security is increased, thereby preventing non-usability of the backup copies.

Figure 4:
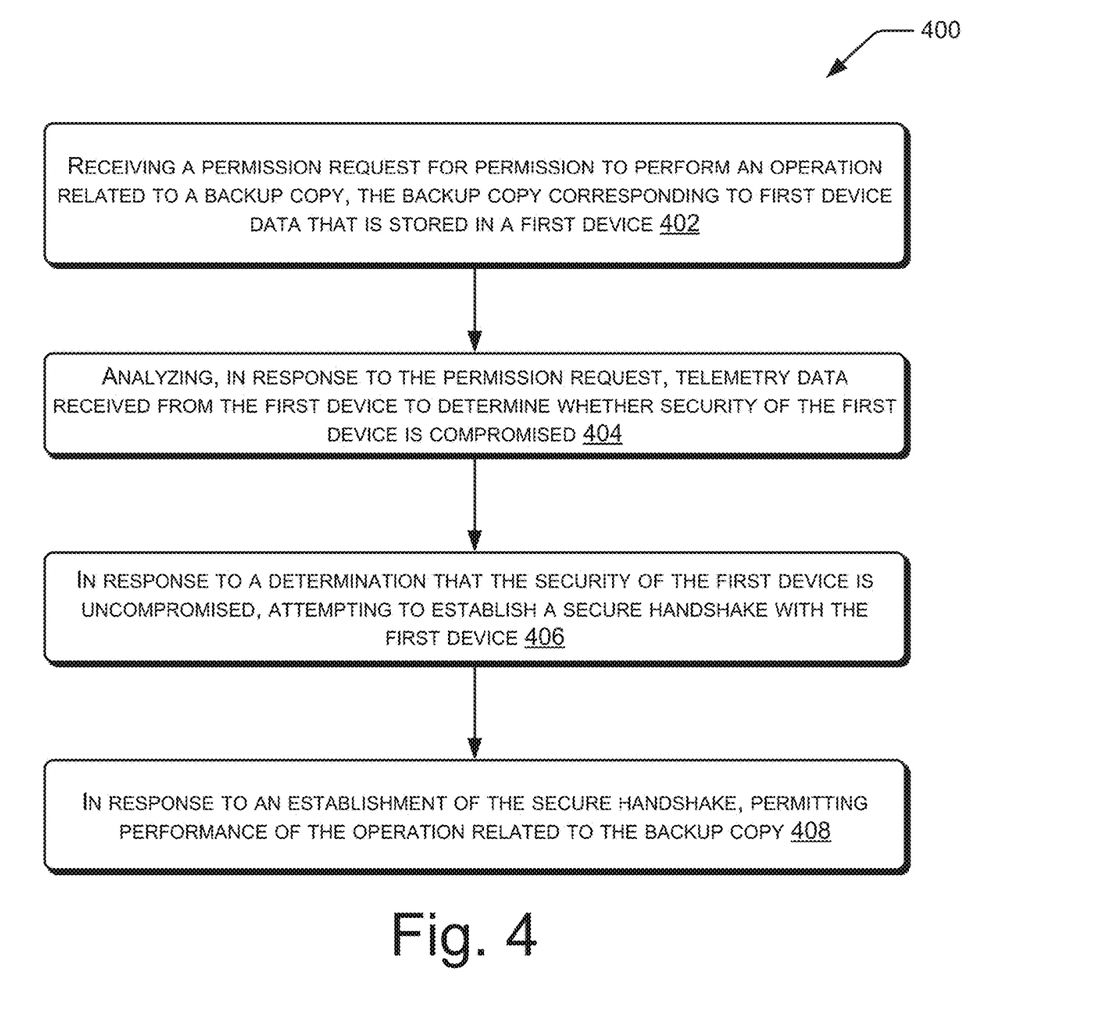
FIG. 4 illustrates a method for permitting performance of backup-related operations, according to an example implementation of the present subject matter.
Figure 5:
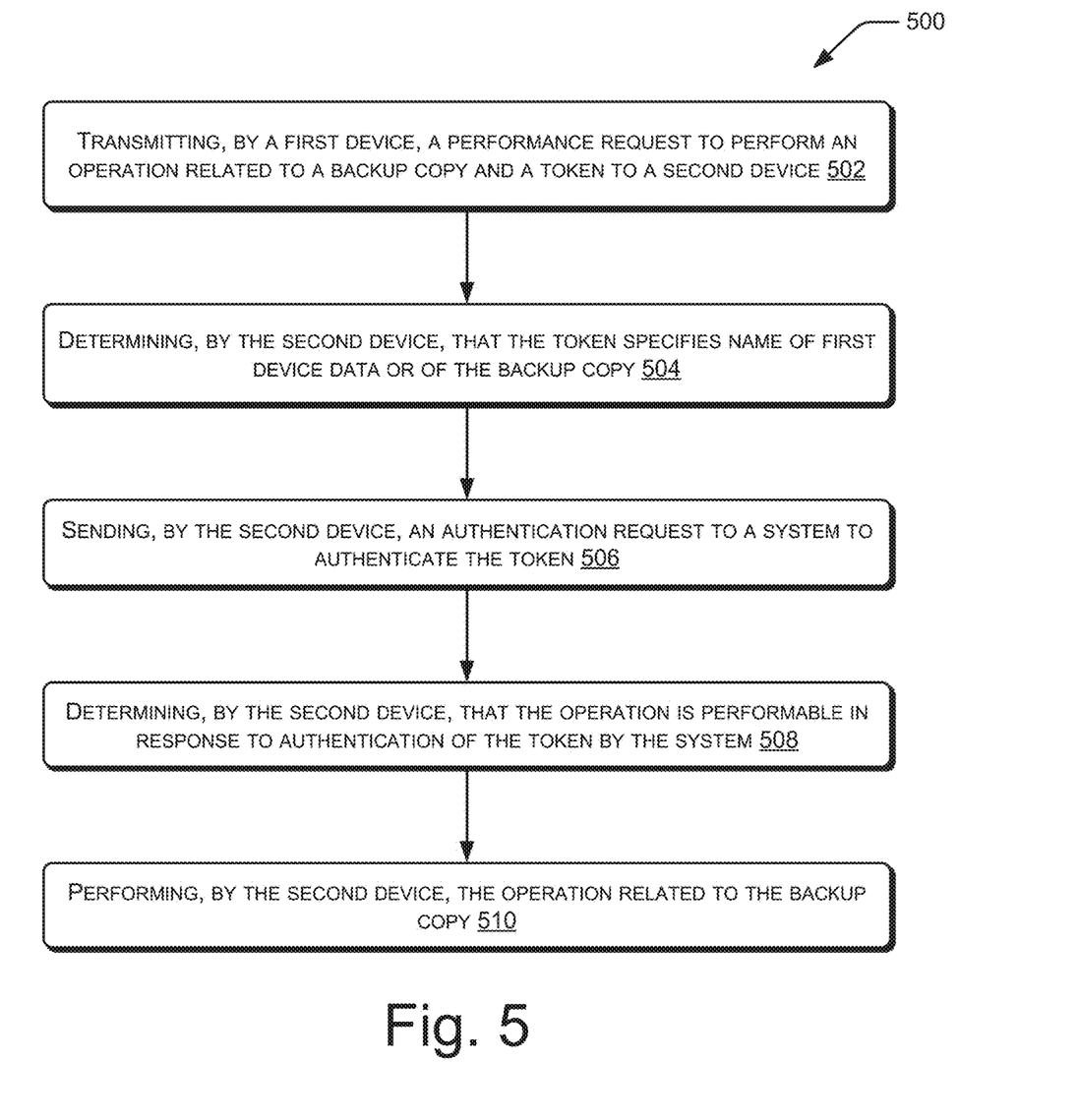
FIG. 5 illustrates a method for performance of backup-related operations, according to an example implementation of the present subject matter.

FIGS. 4 and 5 illustrate methods 400 and 500, respectively, for permitting performance of backup-related operations, according to example implementations of the present subject matter. The orders in which the methods 400 and 500 are described is not intended to be construed as a limitation, and any number of the described method blocks may be combined in any order to implement the method 400, or alternative methods. Furthermore, the methods 400 and 500 may be implemented by processing resource(s) or computing device(s) through any suitable hardware, non-transitory machine-readable instructions, or a combination thereof.

It may be understood that blocks of the methods 400 and 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Although the method 400 may be implemented in a variety of systems, the method 400 is described in relation to the system 100, for ease of explanation. In an example, the method 400 may be performed by a system, such as the system 100.

Referring to FIG. 4, at block 402, a permission request for permission to perform an operation related to a backup copy is received. The backup copy corresponds to first device data that is stored in the first device. The backup copy may be stored or may have to be stored in a second device. In an example, permission request may be a request to modify or delete a backup copy that is stored in the second device. In another example, the permission request may be a request to create a new backup copy in the second device.

The permission request may be received, for example, from the first device or the second device and may be, for example, the permission request 212 or the permission request 306. The first device may be the first device 202, the second device may be the second device 206, the first device data may be the first device data 204, and the backup copy may be the backup copy 208. In an example, the first device data pertains to a VM, such as the VM 302, which is hosted in the first device. Further, the backup copy includes an image from which a VM can be restored, such as the VM backup copy 304. In another example, the first device data pertains to the first device and the backup copy includes an image from which the first device can be restored to its operational state.

In response to the permission request, at block 404, telemetry data received from the first device is analyzed to determine whether security of the first device is compromised. The telemetry data may indicate the operations performed in the first device, the workload information of hardware components of the first device, a backup policy, or other data as explained with reference to FIGS. 1 and 2. In an example, the telemetry data is devoid of contents of the backup copy or contents of the first device data. For instance, if the operation related to the backup copy is a backup copy modification operation, the telemetry data may not indicate the changes made to the first device data. Further, if the operation related to the backup copy is a backup creation operation, the telemetry data may not include the new backup copy. Similarly, if the operation related to the backup copy is a backup deletion operation, the telemetry data may not include the backup copy to be deleted.

In an example, the telemetry data analyzed includes telemetry data received for a first time period before receiving the permission request or the telemetry data received for a second time period after receiving the permission request or both, as explained with reference to FIG. 2. In an example, the telemetry data may be periodically received from the first device. Further, a length of each of the first time period and the second time period may be a multiple of a length of an interval at which the telemetry data is periodically received from the first device. For instance, the length of the interval may be 1 minute, and the first time period and the second time period may each be five minutes, as explained above.

In response to a determination that the security of the first device is uncompromised, at block 406, an attempt is made to establish a secure handshake with the first device. The attempt may include transmitting a message encrypted with a secret key, such as the shared secret key 312, that is known to the first device. If a response is received for the message from the first device, it may be determined that the secure handshake is established, as explained with reference to FIG. 3.

In response to an establishment of the secure handshake, at block 408, the performance of the operation related to the backup copy is permitted. In an example, permitting performance of the operation includes transmitting a token, such as the token 216, to the first device.

FIG. 5 illustrates a method 500 for performance of backup-related operations, according to an example implementation of the present subject matter. The method 500 may be performed, for example, by the first device 202 and the second device 206. Further, the method 500 may be performed upon receipt of the token from the system by the first device.

In an example, the permission request specifies the name of the first device data or of the backup copy. Further, the token may specify the name of the first device data or of the backup copy, whichever was specified in the permission request. Upon receiving the token, at block 502, the first device transmits a performance request, such as the performance request 218 or the performance request 318, to perform the backup-related operation and the token to the second device. At block 504, the second device may then determine that the token specifies the name of the first device data or of the backup copy. Subsequently, the second device may perform the operation related to the backup copy.

In an example, prior to performing the backup-related operation, at block 506, the second device may send an authentication request to the system to authenticate the token. In response to authentication of the token by the system, at block 508, the second device determines that the operation can be performed, as explained with reference to FIG. 2. Subsequently, at block 510, the second device may perform the operation related to the backup copy.

Figure 6:
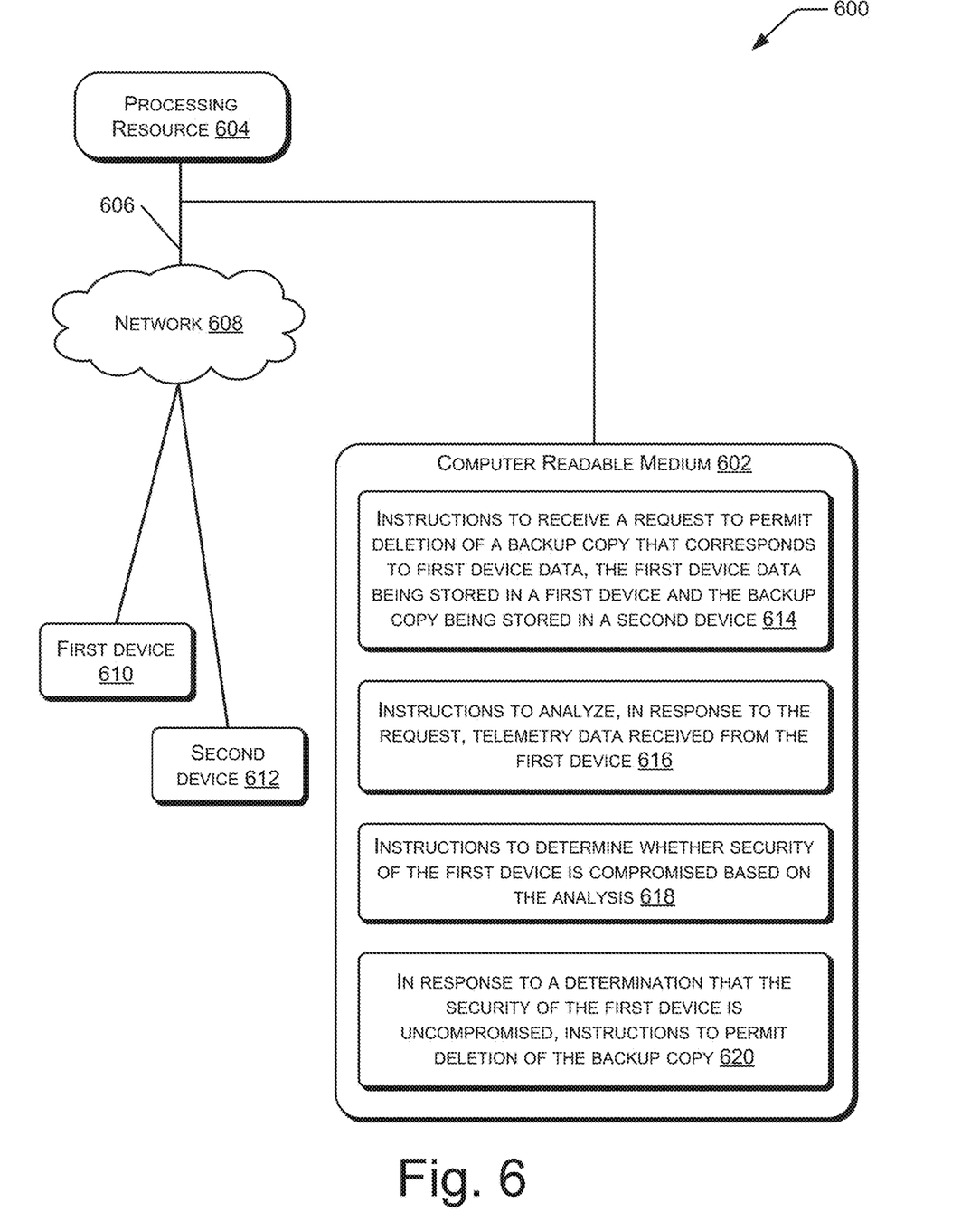
FIG. 6 illustrates a computing environment implementing a non-transitory computer-readable medium for permitting performance of backup-related operations, according to an example implementation of the present subject matter.

FIG. 6 illustrates a computing environment 600 implementing a non-transitory computer-readable medium for permitting performance of backup-related operations, according to an example implementation of the present subject matter. In an example, the non-transitory computer-readable medium 602 may be utilized by a system, such as the system 100. In an example, the computing environment 600 may include a processing resource 604 communicatively coupled to the non-transitory computer-readable medium 602 through a communication link 606. The processing resource 604 may be, for example, the processor 102.

The non-transitory computer-readable medium 602 may be, for example, an internal memory device or an external memory device. In an example, the communication link 606 may be a direct communication link, such as any memory read/write interface. In another example, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a first device 610, which may be a computing device that stores first device data (not shown in FIG. 6), and a second device 612, that stores a backup copy (not shown in FIG. 6) corresponding to the first device data. The first device 610 and the second device 612 may be the first device 202 and the second device 206 respectively. Further, the first device data and the backup copy may be the first device data 204 and the backup copy 208 respectively.

In an example implementation, the non-transitory computer-readable medium 602 includes a set of computer-readable instructions for permitting performance of backup-related operations. The set of computer-readable instructions can be accessed by the processing resource 604 through the communication link 606 and subsequently executed.

Referring to FIG. 6, in an example, the non-transitory computer-readable medium 602 includes instructions 614 that cause the processing resource 604 to receive a request to permit deletion of the backup copy that corresponds to the first device data. The request may be, for example, the permission request 212 or the permission request 306. As mentioned earlier, the first device data is stored in the first device and the backup copy is stored in the second device.

The non-transitory computer-readable medium 602 includes instructions 616 that cause the processing resource 604 to analyze, in response to the request, telemetry data received from the first device. In an example, telemetry data analyzed may be the telemetry data received within a first time period before a time of receipt of the request and telemetry data received within a second time period after a time of receipt of the request, as explained with reference to FIG. 2.

The non-transitory computer-readable medium 602 includes instructions 618 that cause determining whether security of the first device is compromised based on the analysis. In response to a determination that the security of the first device is uncompromised, instructions 620 cause permitting deletion of the backup copy. The deletion may be permitted, for example, by sending a token, such as the token 216, to the first device that indicates the granting of the permission to delete the backup copy.

In an example, in response to a determination that security of the first device is uncompromised based on the analysis of the telemetry data, the instructions are executable by to transmit a message encrypted with a secret key, such as the shared secret key 312, that is known to the first device. Further, the deletion is permitted in response to receipt of a response for the message from the first device, as explained with reference to FIG. 3.

In an example, in addition to granting and refusing permissions for carrying out deletions of backup copies, the instructions also allow granting and refusing permissions for carrying out modifications of backup copies. For instance, the instructions cause receiving a request to modify a second backup copy that corresponds to the first device data. The second backup copy may be, for example, a backup copy of the first device data created after deletion of the backup copy. In response to a determination that the security of the first device is uncompromised, the instructions may grant permission to modify the second backup copy. Similarly, in an example, the instructions may also allow granting and refusing permissions for carrying out creation of backup copies.

The present subject matter may prevent loss and non-usability of a backup copy due to malware attacks on a computing device storing parent data. The present subject matter utilizes telemetry data of a computing device sending a request for the backup-related operation to determine whether security of the computing device is compromised. Therefore, the details of the backup-related operation, such as the changes to be made to the backup copy or the new backup copy, may not have to be analyzed. Thus, the present subject matter may provide a simpler and a more efficient determination regarding the security of the computing device. Further, the present subject matter may leverage the telemetry data that is already received from the computing device for identification and prediction of faults. Thus, additional data may not have to be received from the computing device to implement the present subject matter.

The usage of a data immutability feature in a backup device, which prevents alterations to backup copies, to prevent loss or non-usability of the backup copies may be avoided by implementing teachings of the present subject matter as it verifies security of the computing device before permitting alterations to the backup copies. Therefore, genuine backup-related operations, such as the backup-related operations initiated by a storage administrator, can be performed.

Although implementations of permissions for backup-related operations have been described in language specific to structural features and/or methods, it is to be understood that the present subject matter is not necessarily limited to the specific features or methods described. Rather, the specific features and methods are disclosed and explained as example implementations.

We claim:

1. A system comprising:
   a processor; and
   a non-transitory storage medium comprising instructions executable on the processor to:
   receive a permission request to permit an operation related to a backup copy, the backup copy corresponding to first device data that is stored in a first device, and the backup copy to be stored in a second device;
   analyze, in response to the permission request, telemetry data received from the first device within a first time period relative to a time of receipt of the permission request;
   determine whether a security of the first device is compromised based on the analysis;
   based on a determination that the security of the first device is uncompromised, permit the operation related to the backup copy by sending a token from the system to the first device, wherein the token comprises a name of the first device data or the backup copy, and the token specifies the operation related to the backup copy that is permitted;
   receive, at the system from the second device, the token that was sent from the first device to the second device as part of a performance request from the first device to perform the operation related to the backup copy, wherein the token from the second device is part of an authentication request requesting the system to verify whether the token is valid, and the authentication request is sent from the second device to the system based on a determination at the second device that the performance request from the first device is consistent with the token;
   validate, at the system, the token received from the second device; and
   based on validating the token, send, from the system, a response indicating that the token is authentic to permit performance by the second device of the operation related to the backup copy.

2. The system of claim 1, wherein the telemetry data comprises one or more of a number of login attempts, a number of file encryptions, a number of file modifications, a number of file deletions, workload information of hardware components of the first device, a backup policy, a read count of the first device data, or a write count of the first device data.

3. The system of claim 1, wherein, to analyze the telemetry data received from the first device, the instructions are executable on the processor to compare an actual parameter value that is part of the telemetry data with an expected parameter value corresponding to an uncompromised security state of the first device.

4. The system of claim 1, wherein the instructions are executable on the processor to:
   identify the time of receipt of the permission request;
   determine the first time period that is before or after the time of receipt of the permission request; and
   as part of the analysis, compare the telemetry data received from the first device within the first time period with a remainder of the telemetry data received from the first device.

5. The system of claim 1, wherein the operation related to the backup copy is a backup creation operation, a backup modification operation, or a backup delete operation.

6. The system of claim 1, wherein the determination that the performance request from the first device is consistent with the token is based on a determination that an operation specified by the performance request is consistent with the operation related to the backup copy specified by the token.

7. A method comprising:
receiving, by a system comprising a hardware processor, a permission request for permission to perform an operation related to a backup copy, the backup copy corresponding to first device data that is stored in a first device, and the backup copy to be stored in a second device;
analyzing, by the system in response to the permission request, telemetry data received from the first device to determine whether a security of the first device is compromised;
based on a determination that the security of the first device is uncompromised, permitting the operation related to the backup copy by sending a token from the system to the first device, wherein the token comprises a name of the first device data or the backup copy, and the token specifies the operation related to the backup copy that is permitted;
receiving, at the system from the second device, the token that was sent from the first device to the second device as part of a performance request from the first device to perform the operation related to the backup copy, wherein the token from the second device is part of an authentication request requesting the system to verify whether the token is valid, and the authentication request is sent from the second device to the system based on a determination at the second device that the performance request from the first device is consistent with the token;
validating, by the system, the token received from the second device; and based on validating the token, sending, from the system, a response to the second device indicating that the token is authentic to permit performance by the second device of the operation related to the backup copy.

8. The method of claim 7, wherein the telemetry data comprises telemetry data received in a first time period before receiving the permission request, and telemetry data received in a second time period after receiving the permission request.

9. The method of claim 7, comprising:
based on the determination that the security of the first device is uncompromised, attempting, by the system, to establish a secure handshake with the first device, wherein the permitting of the operation related to the backup copy by the system is further based on an establishment of the secure handshake.

10. The method of claim 9, wherein the attempting to establish the secure handshake comprises transmitting a message encrypted with a secret key that is known to the first device, the method comprising:
determining that the secure handshake is established in response to receiving, from the first device, a response for the message.

11. The method of claim 7, wherein the operation related to the backup copy is a backup creation operation, a backup modification operation, or a backup delete operation.

12. The method of claim 7, wherein the telemetry data comprises one or more of a number of login attempts, a number of file encryptions, a number of file modifications, or a number of file deletions.

13. The method of claim 7, wherein the determination that the performance request from the first device is consistent with the token is based on a determination that an operation specified by the performance request is consistent with the operation related to the backup copy specified by the token.

14. The method of claim 7, wherein the first device data pertains to a virtual machine (VM) hosted in the first device, and the backup copy comprises an image from which the VM can be restored.

15. A non-transitory computer-readable medium comprising instructions, the instructions being executable by a system to:
receive a permission request to permit an operation related to a backup copy that corresponds to first device data, the first device data being stored in a first device and the backup copy to be stored in a second device;
analyze, in response to the permission request, telemetry data received from the first device;
determine whether a security of the first device is compromised based on the analysis;
based on a determination that the security of the first device is uncompromised, permit the operation related to the backup copy by sending a token from the system to the first device, wherein the token comprises a name of the first device data or the backup copy, and the token specifies the operation related to the backup copy that is permitted;
receive, at the system from the second device, the token that was sent from the first device to the second device as part of a performance request from the first device to perform the operation related to the backup copy, wherein the token from the second device is part of an authentication request requesting the system to verify whether the token is valid, and the authentication request is sent from the second device to the system based on a determination at the second device that the performance request from the first device is consistent with the token;
validate, at the system, the token received from the second device; and
based on validating the token, send, from the system, a response indicating that the token is authentic to permit performance by the second device of the operation related to the backup copy.

16. The non-transitory computer-readable medium of claim 15, wherein the first device data pertains to a virtual machine (VM) hosted in the first device, and the backup copy comprises an image from which the VM can be restored.

17. The non-transitory computer-readable medium of claim 15, wherein the operation related to the backup copy is a backup creation operation, a backup modification operation, or a backup delete operation.

18. The non-transitory computer-readable medium of claim 15, wherein the telemetry data comprises one or more of a number of login attempts, a number of file encryptions, a number of file modifications, or a number of file deletions.

* * * * *